US012749905B2

(12) United States Patent
McClure et al.

(10) Patent No.: US 12,749,905 B2
(45) Date of Patent: Sep. 29, 2026

(54) SWITCHABLE PASSIVE DISCHARGE FOR HIGH VOLTAGE ELECTRONICS

(71) Applicant: BorgWarner US Technologies LLC, Wilmington, DE (US)

(72) Inventors: Kirk McClure, Kokomo, IN (US); Scott Gerber, Kokomo, IN (US)

(73) Assignee: BorgWarner US Technologies LLC

(*) Notice: Subject to any disclaimer, the term of this patent is extended or adjusted under 35 U.S.C. 154(b) by 752 days.

(21) Appl. No.: 17/966,704

(22) Filed: Oct. 14, 2022

(65) Prior Publication Data

US 2024/0128767 A1 Apr. 18, 2024

(51) Int. Cl.
*H02J 7/00* (2026.01)
*H02J 7/50* (2026.01)

(52) U.S. Cl.
CPC .................................... *H02J 7/575* (2026.01)

(58) Field of Classification Search
USPC .................................................. 320/134, 136
See application file for complete search history.

(56) References Cited

U.S. PATENT DOCUMENTS 10,854,933 B2 12/2020 Hao et al.
2002/0191418 A1* 12/2002 Clayton ............ H02M 3/33507 363/17
2004/0095096 A1* 5/2004 Melton ............... H02J 7/00047 320/132
2013/0285581 A1* 10/2013 Meyer, III ............ H01M 10/44 318/139
2017/0256972 A1* 9/2017 Namou ............. H02M 7/53875

FOREIGN PATENT DOCUMENTS

CN 107257192 A 10/2017
JP 5733173 B2 6/2015
JP 2015177679 A 10/2015

OTHER PUBLICATIONS

EP Application No. 23203089.0 Extended European Search Report, Issued Feb. 23, 2024, 9 pages.

* cited by examiner

*Primary Examiner* — Samuel Berhanu
(74) *Attorney, Agent, or Firm* — Dickinson Wright PLLC

(57) ABSTRACT

A high-voltage (HV) system is provided including at least one HV component, a passive resistance load coupled to the at least one HV component, a control circuit coupled to the passive resistance load, and an isolated power supply coupled to the control circuit. The control circuit is switchable between a first state in which the control circuit closes an electric circuit connecting the at least one HV component and the passive resistance load and a second state in which the control circuit opens the electric circuit connecting the at least one HV component and the passive resistance load. The isolated power supply controls the control circuit to be in one of the first state and the second state.

13 Claims, 8 Drawing Sheets

SWITCHABLE PASSIVE DISCHARGE FOR HIGH VOLTAGE ELECTRONICS

TECHNICAL FIELD

Apparatuses and methods consistent with example embodiments relate to a passive discharge for high voltage electronics, and, more particularly, to a safe, switchable passive discharge for vehicles and other high voltage electronics.

BACKGROUND

Vehicles, such as cars, trucks, sport utility vehicles, crossovers, mini-vans, and other vehicles, include a powertrain system that includes, for example, a propulsion unit, a transmission, drive shafts, wheels, and other suitable components. The propulsion unit may include one or more of an internal combustion engine, a fuel cell, and an electric motor. A hybrid vehicle may include a powertrain system including more than one propulsion unit. For example, a hybrid vehicle may include both an internal combustion engine and an electric motor that operate cooperatively to propel the vehicle.

In an electric-powered vehicle, such as a hybrid vehicle or a purely electric vehicle, the electronics incorporate a high voltage (HV) battery, often referred to as a rechargeable energy storage system (RESS), as well as other electronic devices and components such as inverters, direct current (DC)/DC converters, and on-board chargers (OBCs) to manage energy output and regeneration within the vehicle. One of the safety requirements for each component is to dissipate any residual high voltage energy from internal high voltage capacitors when the components are powered off or in a defined sleep state that occurs when the main HVDC battery has been decoupled from vehicle electronic components. This decoupling is often accomplished via an HV contactor at the HVDC battery.

When the HVDC contactor is decoupled, residual energy must be dissipated within a specified period of time. Typical requirements are that residual energy must be dissipated from high voltage internal components within about 1-2 minutes to less than about 60 volts (V). This may be accomplished using a passive resistive load. However, an effect of this resistive load is that during normal operation, whenever the HVDC contactor is closed, energy is lost through the resistive load and dissipated as heat. This energy loss can be a substantial loss over a period of time, generally referred to as a drive cycle, which will reduce the overall vehicle range.

SUMMARY

Example embodiments may address at least the above problems and/or disadvantages and other disadvantages not described above. Also, example embodiments are not required to overcome the disadvantages described above, and may not overcome any of the problems described above.

According to an aspect of an example embodiment, a high voltage (HV) system is provided including: an HV module; a passive resistance load coupled to the HV module; a control circuit coupled to the passive resistance load, wherein the control circuit is operable in a first state in which the control circuit closes an electric circuit between the HV module and the passive resistance load and a second state in which the control circuit opens the electric circuit between the HV module and the passive resistance load; and an isolated power supply coupled to the control circuit, wherein the isolated power supply controls the control circuit to be in one of the first state and the second state. The HV module may include one or more HV electrical components including, but not limited to, an inverter.

The control circuit may include a junction-gate field-effect transistor (JFET).

A first one of a drain and a source of the JFET may be operably coupled to the HV module, a second one of the drain and the source of the JFET may be operably coupled to the passive resistance load, and a gate of the JFET may be operably connected to the isolated power supply.

The isolated power supply may include an integrated circuit.

The passive resistance load may be between about 50,000.00 ohms and about 60,000.00 ohms.

According to an aspect of another example embodiment, a vehicle is provided comprising: a chassis; a plurality of wheels; a transmission operably coupled to the plurality of wheels; an electric motor operably coupled to the transmission; and a battery electrically coupled to the electric motor; wherein the electric motor comprises the HV system described above.

According to an aspect of another example embodiment, a control method is provided including: providing a discharge circuit operably connecting the HV module to a passive resistive load and a control circuit; an isolated power supply, operably coupled to the control circuit and controlling the control circuit to switch between a first state in which the control circuit opens the discharge circuit and a second state in which the closes the discharge circuit; a control circuit closing the discharge circuit, thereby connecting the HV electronics to the passive resistive load and discharging the HV module.

According to an aspect of another example embodiment, a non-transitory computer-readable medium is provided, storing thereon executable instructions that, when executed by a processor, facilitate performance of a method comprising: providing a discharge circuit operably connecting the HV module to a passive resistive load and a control circuit; an isolated power supply, operably coupled to the control circuit and controlling the control circuit to switch between a first state in which the control circuit opens the discharge circuit and a second state in which the closes the discharge circuit; a control circuit closing the discharge circuit, thereby connecting the HV electronics to the passive resistance load and discharging the HV module.

BRIEF DESCRIPTION OF THE DRAWINGS

The above and/or other aspects will become apparent and more readily appreciated from the following description of example embodiments, taken in conjunction with the accompanying drawings.

DETAILED DESCRIPTION

Figure 1:
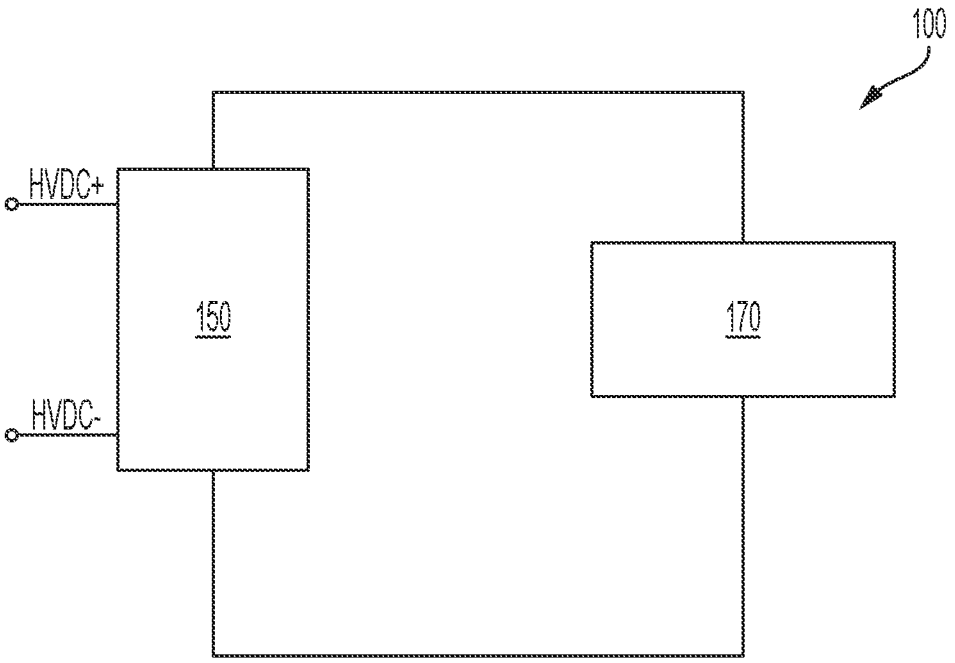
FIG. 1 RELATED ART
FIG. 1 generally illustrates a related art passive discharge circuit.

Reference will now be made in detail to example embodiments which are illustrated in the accompanying drawings, wherein like reference numerals refer to like elements throughout. In this regard, the example embodiments may have different forms and may not be construed as being limited to the descriptions set forth herein.

It will be understood that the terms "include," "including", "comprise, and/or "comprising," when used in this specification, specify the presence of stated features, integers, steps, operations, elements, and/or components, but do not preclude the presence or addition of one or more other features, integers, steps, operations, elements, components, and/or groups thereof.

It will be further understood that, although the terms "first," "second," "third," etc., may be used herein to describe various elements, components, regions, layers and/or sections, these elements, components, regions, layers and/or sections may not be limited by these terms. These terms are only used to distinguish one element, component, region, layer or section from another element, component, region, layer or section.

As used herein, the term "and/or" includes any and all combinations of one or more of the associated listed items. Expressions such as "at least one of," when preceding a list of elements, modify the entire list of elements and do not modify the individual elements of the list.

Various terms are used to refer to particular system components. Different companies may refer to a component by different names—this document does not intend to distinguish between components that differ in name but not function.

Matters of these example embodiments that are obvious to those of ordinary skill in the technical field to which these example embodiments pertain may not be described here in detail.

FIG. 1 illustrates a related art system 100 in which the passive resistive load 170 is coupled to a high voltage module 150 to discharge residual energy stored in one or more capacitors within the HV module. For a 400V system, the passive resistive load 170 varies based on voltage and capacitance, but generally, may be in a range of about 35,000.00 to about 100,000.00 ohms, and for an 800V system, the passive resistive load 170 may be in a range of about 25,000.00 ohms to about 80,000.0000 ohms. For reference the actual voltage range of a 400V system may be anywhere from about 200V to about 550V, and the actual voltage range of an 800V system may be anywhere from about 480V to about 950V.

Figure 2:
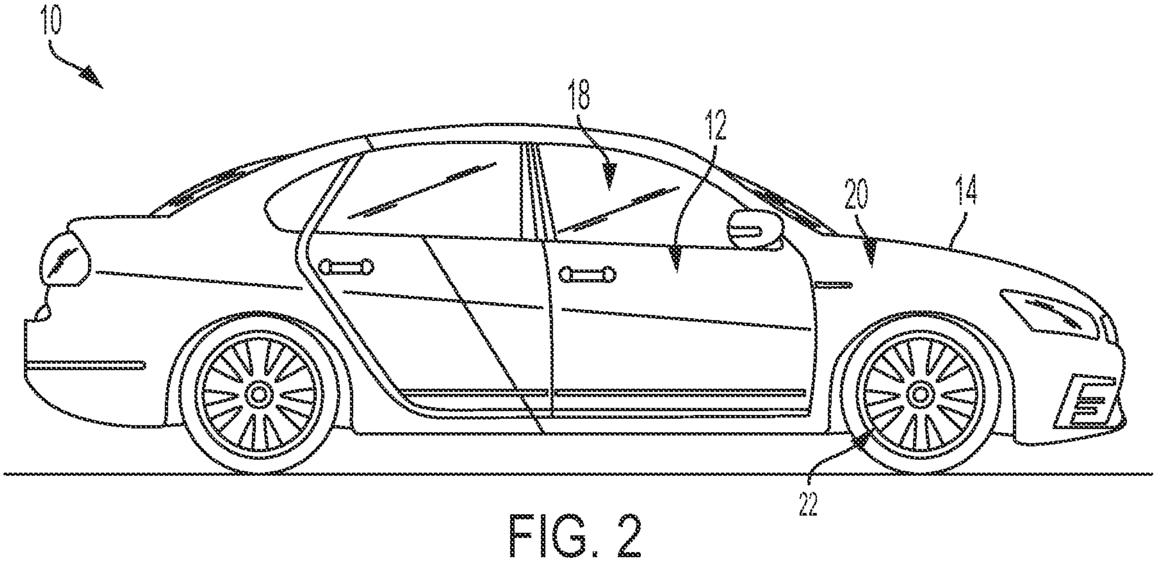
FIG. 2 generally illustrates an example vehicle according to example principles of the present disclosure.

FIG. 2 illustrates an example vehicle 10. The vehicle 10 may be any vehicle, such as a car, a truck, a sport utility vehicle, a mini-van, a crossover, any other passenger vehicle, any commercial vehicle, or any other vehicle. While the vehicle 10 is illustrated as a passenger vehicle having wheels and for use on roads, the principles of example embodiments described herein may apply to other vehicles, such as planes, boats, trains, drones, or other vehicles, as would be understood by one of skill in the art. The vehicle 10 includes a vehicle body 12 and a hood 14. A portion of the vehicle body 12 defines a passenger compartment 18. Another portion of the vehicle body 12 defines the engine compartment 20. The hood 14 may be moveably attached to a portion of the vehicle body 12, such that the hood 14 may provide access to the engine compartment 20 when the hood 14 is in a first or open position and may cover the engine compartment 20 when in a second or closed position.

The passenger compartment 18 may be disposed rearward of the engine compartment 20, as shown, though this is variable. The vehicle 10 may include any suitable propulsion system including, but not limited to: an internal combustion engine; one or more electric motors; one or more fuel cells; and a hybrid propulsion system comprising a combination of one or more internal combustion engines and one or more electric motors. According to one or more example embodiments, the vehicle 10 may include a petrol or gasoline fuel engine, such as a spark ignition engine. Alternately or additionally, the vehicle 10 may include a diesel fuel engine, such as a compression ignition engine. The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a steering wheel, and other such components are disposed in the passenger compartment 18 of the vehicle 10. The propulsion controls may be actuated or controlled by a driver of the vehicle 10 and may be connected, either directly or via other components, to corresponding components of the propulsion system, such as a throttle, a brake, a vehicle axle, a vehicle transmission, and the like. The propulsion controls may communicate signals to a vehicle computer (e.g., drive by wire) which in turn may control the corresponding propulsion components of the propulsion system.

According to one or more example embodiments, the vehicle 10 may include a transmission in operable communication with a crankshaft via a flywheel, a clutch, a fluid coupling or another means. The transmission may be a manual transmission or an automatic transmission. The vehicle 10 may include one or more pistons, in the case of an internal combustion engine or a hybrid vehicle, which cooperatively operate with the crankshaft to generate force, which is translated through the transmission to one or more axles, which turn the wheels 22.

When the vehicle 10 includes an electric motor, at least one battery or fuel cell provide energy to the electric motor to turn the wheels 22. In a case in which the vehicle 10 includes a battery to provide energy to an electric motor, when the battery is depleted, it may be connected to an electric grid (e.g., using a wall socket) to recharge the battery cells. Additionally, or alternatively, the vehicle 10 may employ regenerative braking which uses an electric motor of the vehicle 10 as a generator to convert kinetic energy lost to deceleration back into stored energy in the battery.

The vehicle 10 may additionally include an automatic vehicle propulsion system, such as a cruise control, an adaptive cruise control module or mechanism, an automatic braking control, another automatic vehicle propulsion system, or a combination thereof. The vehicle 10 may be an autonomous or semi-autonomous vehicle. The vehicle 10 may include additional or fewer features than those generally illustrated or described herein.

While example embodiments are described herein as including a high voltage module within an electric or hybrid vehicle, such as that illustrated in FIG. 2, it should be understood that example embodiments may be applied to any high voltage module and are not limited to vehicles.

Figure 3:
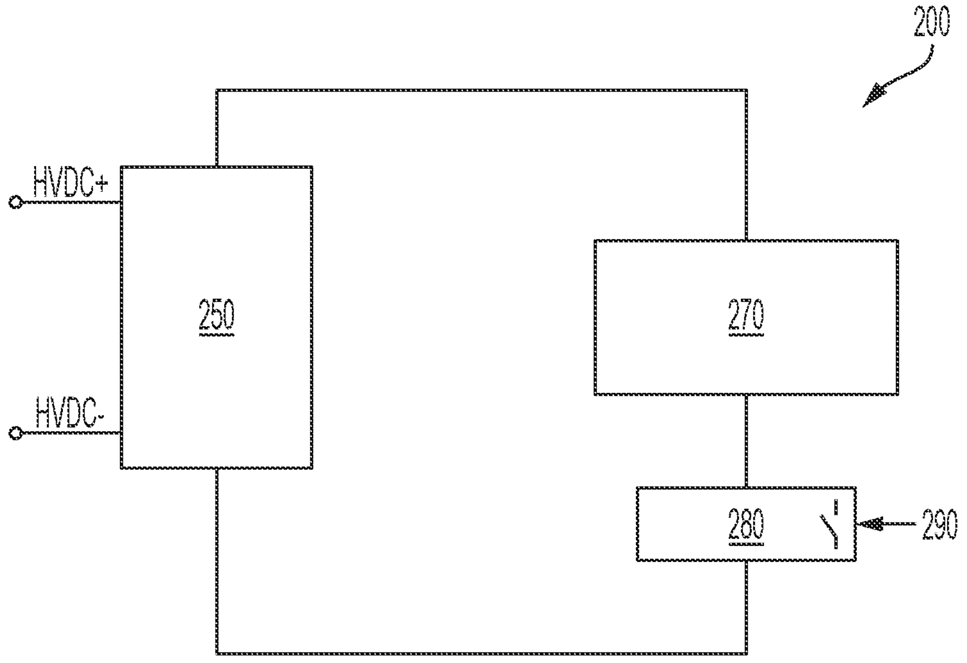
FIG. 3 generally illustrates a passive discharge system according to example principles of the present disclosure.

FIG. 3 illustrates a passive discharge system 200 according to an example embodiment. This example embodiment may provide a simple implementation with a low part count and fail-safe operation. As shown, a high voltage module 250 is operatively connected to a passive resistance load 270 and also to a control circuit 280 which receives a watchdog signal 290. The watchdog signal 290 may originate from any of a variety of elements which enable operation of the control circuit 280 to allow current to pass from the HV module 250 to the passive resistance load 270 or to cut off current from flowing to the passive resistance load 270. For example, the watchdog signal may originate from a control circuit within the HV module 250.

Figure 4:
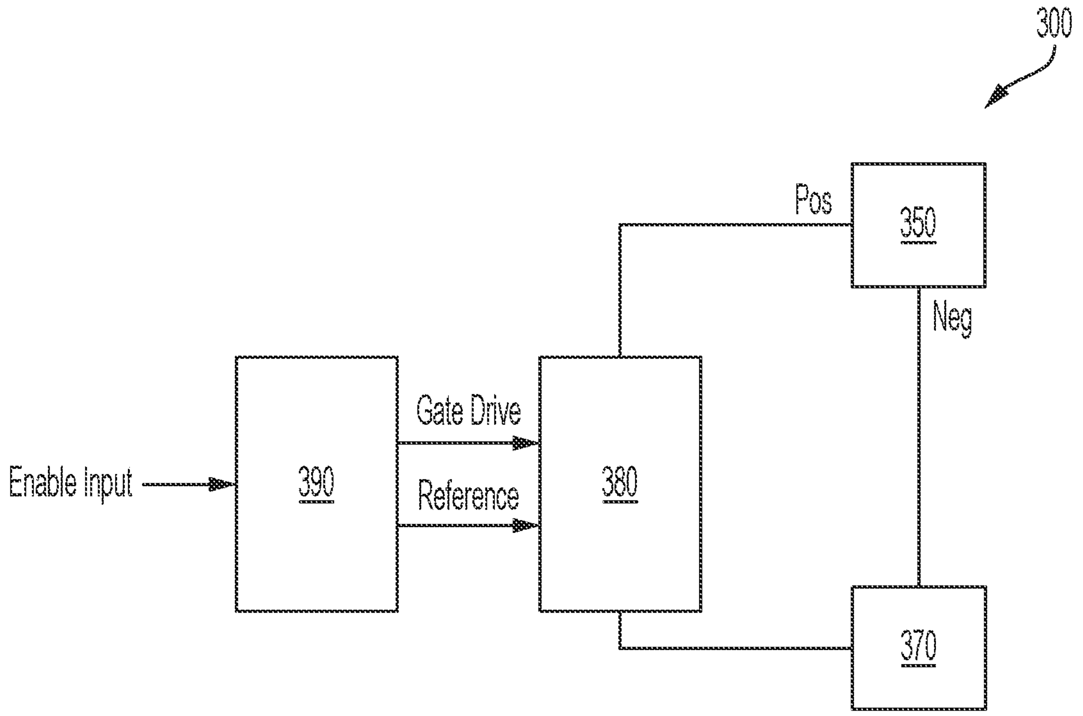
FIG. 4 generally illustrates a passive discharge circuit, including a JFET, according to example principles of the present disclosure.

FIG. 4 illustrates a passive discharge circuit 300 including a control circuit 380 which includes at least one transistor, such as a junction-gate field-effect transistor (JFET), or other suitable transistor, according to an example embodiment. According to one or more example embodiments, the control circuit 380 may include one or more of an SiC JFET, an isolated-gate bipolar transitory (IGBT), a gallium nitride (GaN) transistor, and a metal-oxide-semiconductor field-effect transistor) MOSFET As shown in FIG. 4, this example embodiment incorporates a control circuit 380 including a normally "on" JFET and an integrated circuit (IC) 390 as examples of a control circuit and an isolated power supply, respectively. The JFET 380 may include either an n-type channel or a p-type channel, as would be understood by one of skill in the art. When not powered, i.e. when "inactive," the JFET of the control circuit 380 allows current to flow from drain (D) to source (S), according to the example embodiment of FIG. 4. This attribute of the JFET allows a fail-safe way to discharge the energy stored in a bulk capacitor, for example, within the HV module 350. To cut off the current flow, the isolated power supply 390, connected to the JFET of the control circuit 380, pulls the JFET gate (G) negative. This negative electric field at the gate of the JFET cuts off the current flow from drain (D) to source (S). This cut-off effectively opens the circuit to which the JFET 380 is connected and prevents current flow. When the electrical charge at the gate is removed, the JFET depletion field is at its maximum current flow condition. The flow of current to the passive resistance load when the JFET depletion field is at its maximum current flow condition allows the voltage to be brought down to a safe level through energy loss to heat in the passive resistance load 370.

According to this example embodiment, the dissipation of excess high voltage charge is fail safe: when power to the microcontroller is lost and/or the circuit is no longer powered, the power will flow to the passive resistance load and will be dissipated.

Figure 5A:
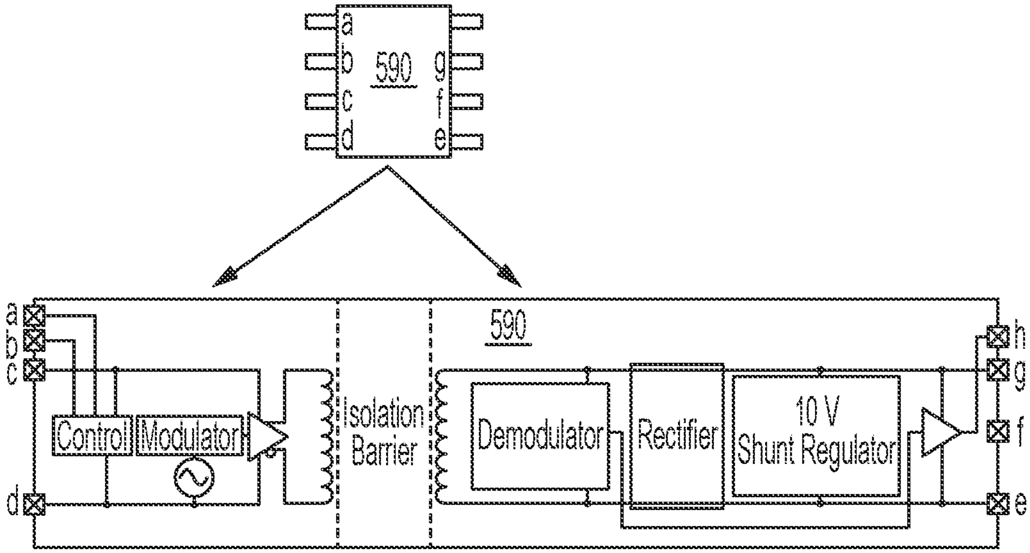
FIGS. 5A and 5B generally illustrate an isolated power supply and a control circuit, respectively, according to example principles of the present disclosure.
Figure 5B:
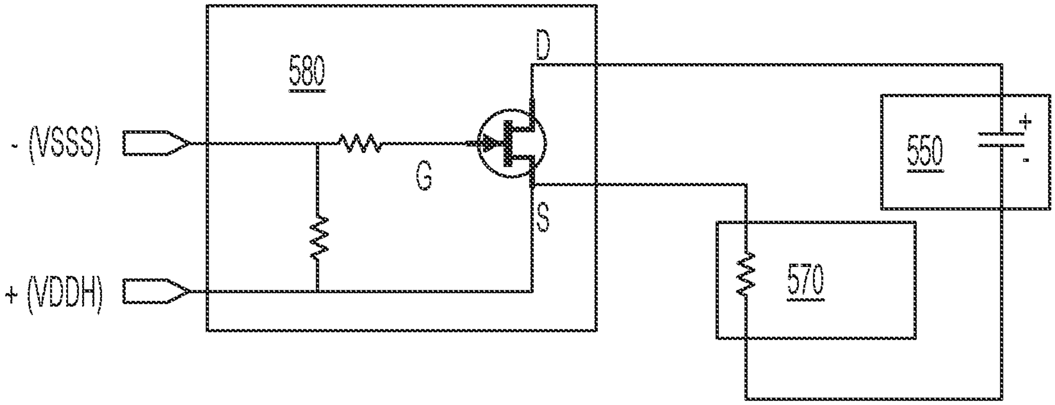

FIGS. 5A and 5B generally illustrate an isolated power supply and a control circuit, respectively, according to example principles of the present disclosure. FIG. 5A illustrate an integrated circuit (IC) 590 as an example of the isolated power supply 390 of FIG. 4. As shown, the IC 590 receives inputs a, b, c, and, where input a functions as a watchdog signal. The watchdog signal a may be an enable signal, e.g., a signal of 0V or 5V) received at the IC 590 from the HV module itself. For example, a control signal from an internal element of the HV module may function as the watchdog signal. The IC 590, functioning as the isolated power supply, outputs signals e, f, g, and h. FIG. 5B illustrates a control circuit 580 connected to the HV module 550 and the passive resistance 570. The control circuit 580 may include a JFET and one or more resistors, as shown. The output signal g, from the IC 590 may serve as a drain signal and be connected to the control circuit 580 and to the drain of the JFET. The output signal e, from the IC 590 may serve as a source signal and be connected to the control circuit 580 and the source of the JFET.

Figure 6:
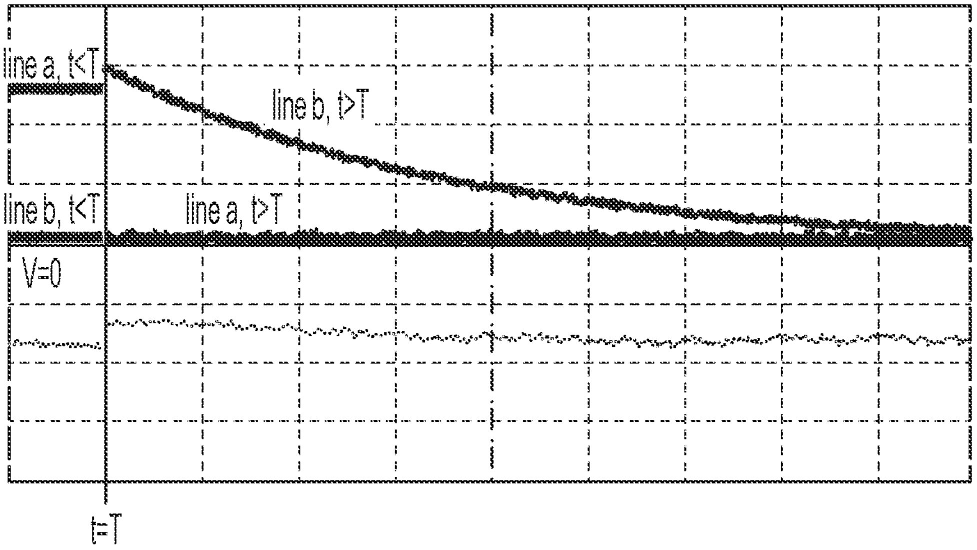
FIG. 6 generally illustrates a graphical representation of the flow of HVDC power through the system of FIGS. 3 and 4, when power is lost to the inverter, according to example principles of the present disclosure.

FIG. 6 is a graphical representation of the flow of HVDC power through the example system of FIGS. 3 and 4, when power is lost to the inverter within the HV module. As shown, when power is lost to the inverter, at t=T, the power to the inverter, shown in line (a), drops to zero, while the power across the passive resistance, shown in line (b), jumps up and is then rapidly dissipated. The lowest line illustrates the current flow through the passive resistance load.

Figure 7:
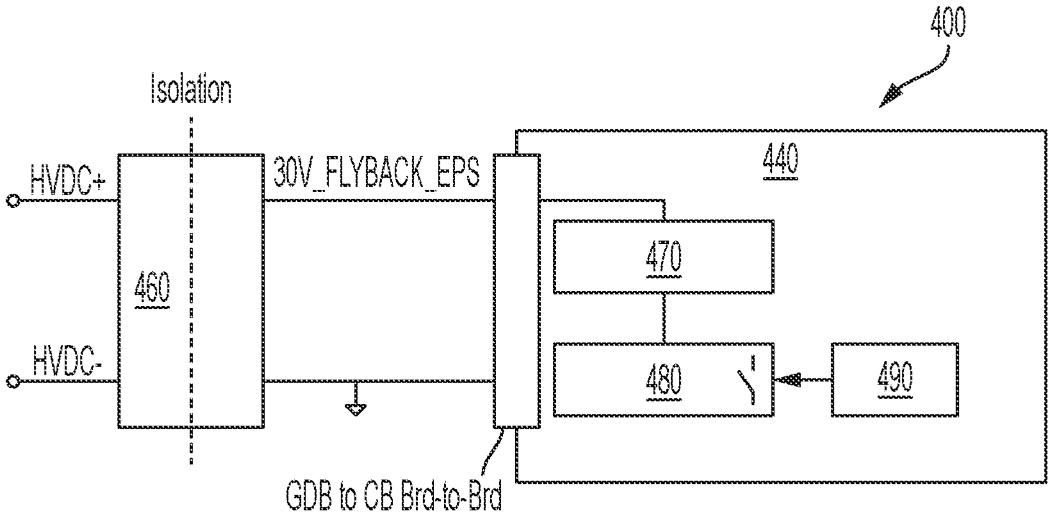
FIG. 7 generally illustrates a passive discharge system according to example principles of the present disclosure.
Figure 8:
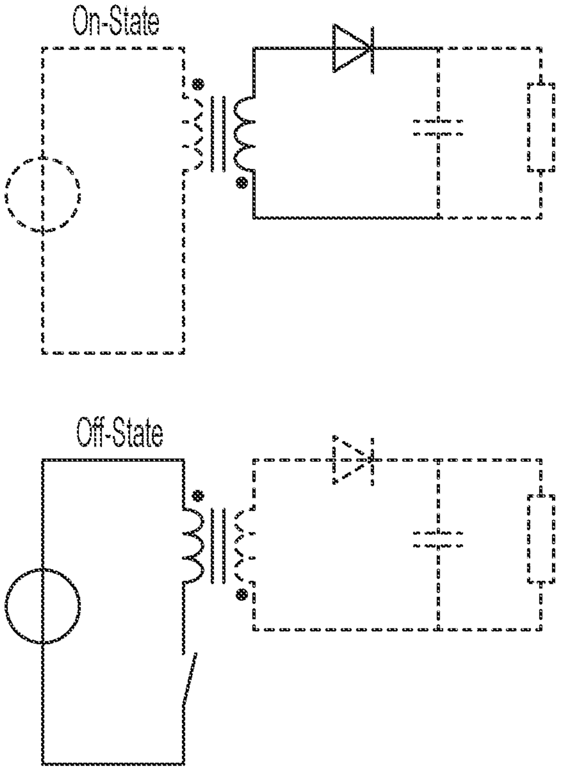
FIG. 8 generally illustrates the two configurations of an example flyback circuit (also referred to as a flyback converter) in operation, according to example principles of the present disclosure.

FIG. 7 illustrates a passive discharge system 400 according to another example embodiment. Various example systems may include an HV flyback circuit 460 that powers the HV module (not shown) and provides power to all the controls, and is used in a case in which connection to the battery is lost, so that the internal systems may continue to function. Such a flyback circuit 460 may be powered using any suitable amount of power, such as about 15-20 watts or other suitable power value or range. FIG. 8 illustrates two configurations of an example flyback circuit (also referred to as a flyback converter) in operation. As shown, in an "on" state, energy is transferred from an input voltage source to the transformer. In the "off" state, the energy is transferred from the transformer to an output load. According to the example embodiment of FIG. 7, an additional flyback resistance load 470 is added to the circuit has sufficient load to pull energy to discharge using a control circuit 480 and watchdog 490, as described herein. Thus, the watchdog circuit 490 turns off the additional resistance load 470 for normal inverter operation and turns on the additional resistive load upon 470 shutdown of the inverter. As illustrated, the additional features may be incorporated into a unitary circuit board 440, but may be incorporated using multiple circuit boards.

One or more example embodiments described herein may eliminate the passive resistive energy loss during normal operation. One or more example embodiments may save 2.3 to 2.6 Watts continuous on 400V systems or 13-19 Watts continuous on 800V systems According to one or more example embodiments, a controller may perform methods described herein. However, these methods are not meant to be limiting, and any type of software executed on a controller can perform one or more methods described herein. For example, any suitable controller, such as a processor executing software within a computing device onboard the vehicle 10, can perform one or more methods described herein.

In some example embodiments, a non-transitory computer-readable storage medium includes executable instructions that, when executed by a processor, facilitate performance of operations, including, but not limited to, example methods described herein.

Implementations of the systems, algorithms, methods, instructions, etc., described herein can be realized in hardware, software, or any combination thereof. The hardware may include, but is not limited to, for example: computers, intellectual property (IP) cores, application-specific integrated circuits (ASICs), programmable logic arrays, optical processors, programmable logic controllers, microcode, microcontrollers, servers, microprocessors, and digital signal processors. As used herein, the term "processor" should be understood as encompassing any of the foregoing hardware, either singly or in combination. Furthermore, as used herein, the terms "signal" and "data" are interchangeable.

As used herein, the term "module" may additionally include one or more of: a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module may include an application specific integrated circuit (ASIC), a Field Programmable Gate Array (FPGA), a circuit, digital logic circuit, an analog circuit, a combination of discrete circuits, gates, and other types of hardware or combination thereof. A module may also include a memory that stores instructions executable by a controller to implement a feature of the module.

According to one or more example embodiments, systems described herein may be implemented using a general-purpose computer or general-purpose processor with a computer program that, when executed, carries out any of the methods, algorithms, and/or instructions described herein. In addition, or alternately, a special purpose computer/processor can be utilized which may contain other hardware for carrying out any of the methods, algorithms, and/or instructions described herein.

According to one or more example embodiments, all, or a portion of implementations described herein may take the form of a computer program product accessible from, for example, a computer-usable or computer-readable medium. A computer-usable or computer-readable medium mat be any device that, for example, tangibly contains, stores, communicates, or transports a program for use by or in connection with any processor. The medium may be, for example, an electronic, magnetic, optical, electromagnetic, or semiconductor device. Other suitable tangible mediums are also available.

It may be understood that the example embodiments described herein may be considered in a descriptive sense only and not for purposes of limitation. Descriptions of features or aspects within each example embodiment may be considered as available for other similar features or aspects in other example embodiments.

While example embodiments have been described with reference to the figures, it will be understood by those of ordinary skill in the art that various changes in form and details may be made therein without departing from the spirit and scope as defined by the following claims.

What is claimed is:

1. A control method of discharging at least one high voltage (HV) component, the method comprising:

providing a discharge circuit configured to connect the at least one HV component to a passive resistance load and a control circuit, wherein the control circuit comprises a junction-gate field-effect transistor (JFET);

providing an isolated power supply, operably coupled to the control circuit, configured to control the control circuit to switch between a first state in which the control circuit opens the discharge circuit and a second state in which the control circuit closes the discharge circuit, wherein the isolated power supply pulls a gate of the JFET negative to control the control circuit to open the discharge circuit, wherein the isolated power supply includes a high voltage flyback power supply, and wherein the control circuit is connected to an additional flyback resistance load;

the control circuit closing the discharge circuit, thereby allowing the at least one HV component to discharge through the passive resistance load, wherein the additional flyback resistance load is controlled by a watchdog circuit configured to turn on the additional flyback resistance load in response to the discharge circuit closing and turn off the additional flyback resistance load in response to the discharge circuit opening.

2. The method according to claim 1, wherein a first one of a drain and a source of the JFET is operably coupled to the at least one HV component, a second one of the drain and the source of the JFET is operably coupled to the passive resistance load, and a gate of the JFET is operably coupled to the isolated power supply.

3. The method according to claim 1, wherein the isolated power supply comprises an integrated circuit.

4. The method according to claim 1, wherein the passive resistive load has a resistance value within a range of about 60,000.00 ohms to 50,000.00 ohms.

5. A high voltage (HV) system comprising:

at least one HV component;

a passive resistance load coupled to the at least one HV component;

a control circuit that includes a junction-gate field-effect transistor (JFET) and is coupled to the passive resistance load, wherein the control circuit is operable in a first state in which the control circuit closes an electric circuit connecting the at least one HV component and the passive resistance load and a second state in which the control circuit opens the electric circuit connecting the at least one HV component and the passive resistance load; and an isolated power supply operably coupled to the control circuit, wherein the isolated power supply controls the control circuit to be in one of the first state and the second state, wherein the isolated power supply controls the control circuit to be in the first state by pulling a gate of the JFET negative, wherein the isolated power supply includes a high voltage flyback power supply, and wherein the control circuit is connected to an additional flyback resistance load, wherein the additional flyback resistance load is controlled by a watchdog circuit configured to turn on the additional flyback resistance load in response to the electronic circuit closing and turn off the additional flyback resistance load in response to the electronic circuit opening.

6. The HV system according to claim 5, wherein a first one of a drain and a source of the JFET is operably coupled to the at least one HV component, a second one of the drain and the source of the JFET is operably coupled to the passive resistance load, and a gate of the JFET is operably connected to the isolated power supply.

7. The HV system according to claim 5, wherein the isolated power supply comprises an integrated circuit.

8. The HV system according to claim 5, wherein the passive resistance load has a resistance value within a range of about 60,000.00 ohms to 50,000.00 ohms.

9. A vehicle comprising:

a chassis;

a plurality of wheels;

a transmission operably coupled to the plurality of wheels;

an electric motor operably coupled to the transmission; and a battery electrically coupled to the electric motor;

wherein the electric motor comprises the HV system according to claim 5.

10. A non-transitory computer-readable medium, storing thereon executable instructions that, when executed by a processor, facilitate performance of a method comprising:

providing a discharge circuit configured to connect at least one HV component to a passive resistance load and a control circuit that includes a junction-gate field-effect transistor (JFET);

an isolated power supply, operably coupled to the control circuit and configured to control the control circuit to switch between a first state in which the control circuit opens the discharge circuit and a second state in which the control circuit closes the discharge circuit, wherein the isolated power supply pulls a gate of the JFET negative to control the control circuit to open the discharge circuit, wherein the isolated power supply includes a high voltage flyback power supply, and wherein the control circuit is connected to an additional flyback resistance load;

the control circuit closing the discharge circuit, thereby allowing the at least one HV component to discharge through the passive resistance load, wherein the additional flyback resistance load is controlled by a watchdog circuit configured to turn on the additional flyback resistance load in response to the discharge circuit closing and turn off the additional flyback resistance load in response to the discharge circuit opening.

11. The non-transitory computer-readable medium according to claim 10, wherein a first one of a drain and a source of the JFET is operably coupled to the at least one HV component, a second one of the drain and the source of the JFET is operably coupled to the passive resistance load, and a gate of the JFET is operably coupled to the isolated power supply.

12. The non-transitory computer-readable medium according to claim 10, wherein the isolated power supply comprises an integrated circuit.

13. The non-transitory computer-readable medium according to claim 10, wherein the passive resistive load has a resistance value within a range of about 60,000.00 ohms to 50,000.00 ohms.

* * * * *